US007726133B2

(12) United States Patent
Hannemann et al.

(10) Patent No.: US 7,726,133 B2
(45) Date of Patent: Jun. 1, 2010

(54) METHOD FOR OPERATING A BURNER OF A GAS TURBINE AND A POWER PLANT

(75) Inventors: Frank Hannemann, Spardorf (DE); Andreas Heilos, Mülheim (DE); Michael Huth, Essen (DE); Berthold Köstlin, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 816 days.

(21) Appl. No.: 10/482,388

(22) PCT Filed: Jul. 8, 2002

(86) PCT No.: PCT/EP02/07589

§ 371 (c)(1),
(2), (4) Date: Dec. 31, 2003

(87) PCT Pub. No.: WO03/008768

PCT Pub. Date: Jan. 30, 2003

(65) Prior Publication Data

US 2004/0172951 A1 Sep. 9, 2004

(30) Foreign Application Priority Data

Jul. 19, 2001 (EP) .................................... 0117470

(51) Int. Cl.
*F02C 3/28* (2006.01)
*F02C 7/22* (2006.01)
*F02C 9/34* (2006.01)

(52) U.S. Cl. .......................... 60/780; 60/39.12; 60/746; 60/742; 60/39.464; 60/734

(58) Field of Classification Search ................... 60/733, 60/742, 39.12, 746, 39.464, 780, 739, 734
See application file for complete search history.

(56) References Cited

U.S. PATENT DOCUMENTS 2,750,741 A * 6/1956 Leeper .................... 60/39.281

(Continued)

FOREIGN PATENT DOCUMENTS

DE 19837251 8/1998

(Continued)

OTHER PUBLICATIONS

Maghon et al, Oct. 21-25, 1990, "Progress in NOx Emission Reduction of Gas Turbines," The American Society of Mechanical Engineers, 90-JPGC/GT, pp. 1-7.*

(Continued)

*Primary Examiner*—Ted Kim
(74) *Attorney, Agent, or Firm*—Harness, Dickey & Pierce, P.L.C.

(57) ABSTRACT

A method is for operating a burner of a gas turbine. A fossil fuel is gasified and the gasified fossil fuel is fed as synthesis gas into the burner for combustion. The burner is connected to the gas turbine. The synthesis gas is divided into a first partial current and a second partial current and the partial currents are each fed into the burner for combustion. A power plant, particularly a gas and steam turbine system, includes a gasification device for a fossil fuel.

27 Claims, 3 Drawing Sheets

U.S. PATENT DOCUMENTS

| | | | | |
|---|---|---|---|---|
| 3,930,743 | A | * | 1/1976 | Stern .................... 415/36 |
| 4,341,069 | A | | 7/1982 | Bell et al. |
| 4,697,415 | A | | 10/1987 | Schiffers |
| 4,726,192 | A | * | 2/1988 | Willis et al. ............ 60/737 |
| 4,890,453 | A | * | 1/1990 | Iwai et al. .............. 60/39.465 |
| 5,345,756 | A | | 9/1994 | Jahnke et al. |
| 5,451,160 | A | * | 9/1995 | Becker .................... 431/284 |
| 5,704,206 | A | * | 1/1998 | Kaneko et al. .......... 60/39.12 |
| 5,713,206 | A | * | 2/1998 | McWhirter et al. ...... 60/747 |
| 5,865,023 | A | * | 2/1999 | Sorensen et al. ......... 60/775 |
| 5,899,073 | A | * | 5/1999 | Akimaru ................ 60/736 |
| 6,092,362 | A | * | 7/2000 | Nagafuchi et al. ....... 60/739 |
| 6,510,695 | B1 | * | 1/2003 | Fisher .................... 60/780 |

FOREIGN PATENT DOCUMENTS

| | | | |
|---|---|---|---|
| DE | | 19832293 | 10/1999 |
| GB | | 2234984 | 2/1991 |
| JP | | 55-69731 | * 8/1980 |
| JP | | 59092367 | 6/1984 |
| JP | | 7166891 | 6/1995 |
| JP | | 7260149 | 10/1995 |
| WO | | 0011325 | 3/2000 |
| WO | WO | 00/20728 | 4/2000 |

OTHER PUBLICATIONS

Haupt G:" Effiziente Und Umweltfreundliche Stromerzeugung Im Gud-Kraftwerk Mit Integrierter Vergasung" Elektrotechnik Und Informationstechnik, Springer Verlag, Wien, AT, vol. 113, No. 2, Feb. 1, 1996 p. 102-108, XP 000555695 ISSN: 0932-383X the Whole Document.

Excerpt from "Thermal Power Generating Plants, Graphical Symbols, German Standard," Jun. 1979, pp. 8, 11, 12 and 13.

Excerpt from "Power Plant Engineering Dictionary," 1996, pp. 140, 141, 286, 287, 344, and 345, provided as an English translation to "Thermal Power Generating Plants, Graphical Symbols, German Standard."

* cited by examiner

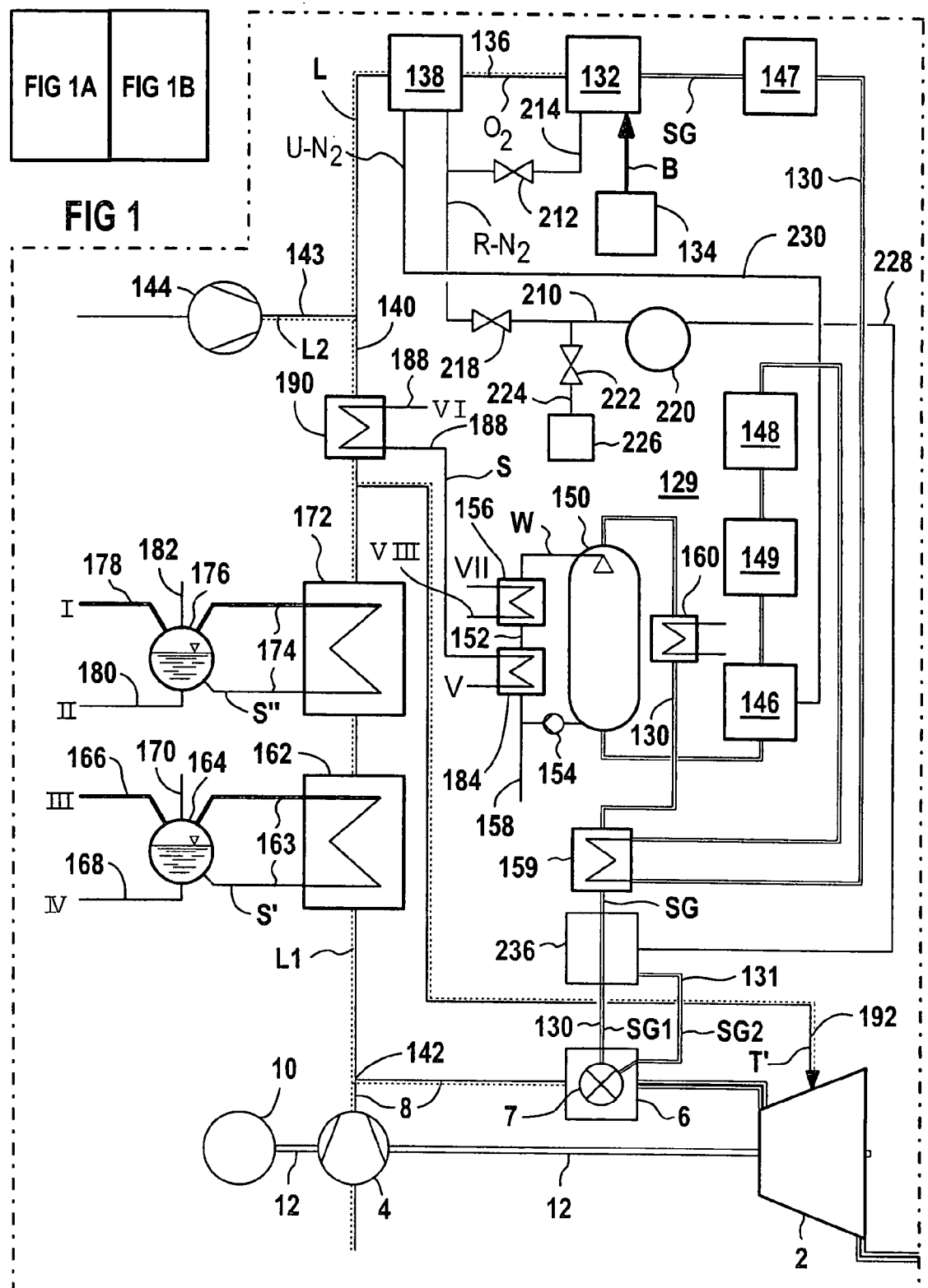

METHOD FOR OPERATING A BURNER OF A GAS TURBINE AND A POWER PLANT

This application is the national phase under 35 U.S.C. §371 of PCT International Application No. PCT/EP02/07589 which has an International filing date of Jul. 8, 2002, which designated the United States of America and which claims priority on European Patent Application number EP 01117470.3 filed Jul. 19, 2001, the entire contents of which are hereby incorporated herein by reference.

FIELD OF THE INVENTION

The invention generally relates to a method for operating a burner of a gas turbine. Preferably, it relates to one in which a fossil fuel is gasified in a gasification device and gasified fuel is fed as synthesis gas to the burner assigned to the gas turbine in order to be burnt. The invention also generally relates to a power plant installation. In particular it relates to one for carrying out the method, and/or having a gas turbine which is assigned a combustion chamber having at least one burner. Upstream of the combustion chamber there is a fuel system, which includes a gasification device for fossil fuel and a gas line which branches off from the gasification device and opens out into the combustion chamber.

BACKGROUND OF THE INVENTION

A gas and steam turbine installation with integrated gasification of fossil fuel usually includes a gasification device for the fuel, which on the outlet side is connected to the combustion chamber of the gas turbine via a number of components provided for gas purification purposes. A heat recovery steam generator, the heating surfaces of which are connected into the water steam circuit of a steam turbine, may be connected downstream of the gas turbine on the flue gas side. An installation of this type is known, for example, from GB A 2 234 984 or U.S. Pat. No. 4,697,415.

To reduce the emission of pollutants during the combustion of the gasified fossil fuel or synthesis gas, a saturator, in which the synthesis gas is laden with steam when the installation is operating, may be connected into the gas line. For this purpose, the gasified fuel flows through the saturator in countercurrent to a flow of water which is passed through a water circuit referred to as the saturator circuit. To achieve a particularly high level of efficiency, there is provision for heat from the water steam circuit of a gas and steam turbine installation to be introduced into the saturator circuit.

As a result of contact with the heated flow of water guided in the saturator circuit in the saturator, the gasified fuel is saturated with steam and is heated to a limited extent. For thermal reasons and also for operating reasons, it may be necessary to further heat the fuel before it is fed into the combustion chamber of the gas turbine.

DE 19 832 293 A1 has described a gas and steam turbine installation having a heat recovery steam generator connected downstream of the gas turbine on the flue gas side. The heating surfaces of the heat recovery steam generator are in this case connected into the water steam circuit of the steam turbine. A gasification device for fuel is connected upstream of the combustion chamber, via a fuel line, for the purpose of integrated gasification of a fossil fuel for the combustion chamber. To achieve a particularly high efficiency in the installation, the fuel line, between the gasification device and the saturator, includes, in addition to a mixing device for admixing nitrogen, a heat exchanger on the primary side, which on the secondary side is likewise connected into the fuel line, between the saturator and the combustion chamber.

A similar gas and steam turbine installation to that described in DE 19 832 293 A1 is disclosed by WO 00/20728. It is intended for it to be possible for the gas and steam turbine installation described in that document to be operated with a particularly high level of efficiency even when oil is used as fossil fuel.

For this purpose, in WO/20728, a heat exchanger is connected into the fuel line on the primary side, upstream of a mixing device for admixing nitrogen to the gasified fuel, as seen in the direction of flow of the gasified fuel, which heat exchanger, on the secondary side, is designed as an evaporator for a flow medium. On the steam side, the heat exchanger is connected to the combustion chamber of the gas turbine.

To ensure particularly reliable operation of the gas and steam turbine installation, it should be possible for a feed of the synthesis gas into the combustion chamber of the gas turbine to be stopped at any time. For this purpose, a quick closing fitting should usually be connected into the gas line upstream of the combustion chamber. When required, the quick closing fitting blocks off the gas line within a particularly short time, so that it is impossible for any synthesis gas to enter the combustion chamber assigned to the gas turbine.

On account of the relevant safety regulations, the fuel system usually includes a gas lock. A gas lock includes two fittings, for example ball valves, which can be opened or closed to a flow of gas. An intermediate relief or a pressure line is connected in between these two fittings. The intermediate relief may be connected to an excess gas burner, via which excess gas can be burnt off. As an alternative to the intermediate relief, the pressure line can be connected up, ensuring that it is impossible for any gas to flow in via the gas lock fittings. The gas lock therefore separates the fuel system in gastight manner in a first region or the gasification system upstream of the gas lock and in a second region or what is known as the gas turbine fuel system downstream of the gas lock.

A gas and steam turbine installation with gasification device can be operated both with the synthesis gas, which is generated, for example, from coal, industrial residues or garbage, and with a second fuel, such as for example natural gas or oil. In the event of a changeover from synthesis gas to second fuel or vice versa, it is for safety reasons necessary for the region between the gas lock and the combustion chamber, i.e. the gas turbine fuel system, to be purged with an inert medium, such as nitrogen or steam.

To allow a gas and steam turbine installation to be optionally operated with the synthesis gas from a gasification device or a second or substitute fuel, the burner in the combustion chamber assigned to the gas turbine has to be designed as a two fuel or multi fuel burner, to which both the synthesis gas and the second fuel, e.g. natural gas or fuel oil, can be fed according to the particular requirements. The corresponding fuel is in this case supplied to the combustion zone via a fuel passage in the burner.

SUMMARY OF THE INVENTION

It is an object of an embodiment of the invention to provide a method for operating a burner of a gas turbine which makes it possible to achieve improved synthesis gas operation. A further object of an embodiment of the invention is to provide a power plant installation, in particular for carrying out the method.

According to an embodiment of the invention, the first object mentioned may be achieved by a method for operating a burner of a gas turbine, in which a fossil fuel is gasified, and gasified fossil fuel is fed as synthesis gas to the burner assigned to the gas turbine in order to be burnt, in which method the synthesis gas is divided into a first part stream and a second part stream, and the part streams are fed separately to the burner in order to be burnt.

In this case, according to an embodiment of the invention, it is also quite possible to provide more than two part streams and for these part streams in each case to be fed separately to the burner in order to be burnt.

An embodiment of the invention is therefore based on the observation that the overall efficiency of power plant installations, for example of gas and steam turbine installations with integrated gasification of a fossil fuel, deteriorates the higher the fuel side pressure loss becomes in the burner to which the fuel is fed in order to be burnt. The pressure loss is in this case defined by the flow resistance or the flow conductance of the burner for the corresponding fuel gas.

When a gas flows through a line, the pressure difference which occurs is proportional to the gas flow, i.e. the mass flow of gas. The proportionality factor is known as the flow resistance. The reciprocal of the flow resistance is known as the flow conductance. On account of the efficiency considerations for a power plant installation referred to above, it is necessary for this burner pressure loss in design situations, e.g. at nominal load, to be minimized. However, the result of this is that at very low gas turbine powers or when the gas turbine is idling, the burner pressure loss on the fuel side is too low and the combustion is no longer sufficiently stable with respect to flame oscillations. Therefore, for installation designs of this nature, output operation in the synthesis gas mode is only possible between base load and a minimum partial load of the gas turbine, which is dependent on the prevailing conditions.

An embodiment of the invention now provides a completely new way of operating the burner of a gas turbine with synthesis gas, with the fuel gas which is formed from the gasification of a fossil fuel and has a low calorific value compared to natural gas being fed to the burner in at least two separate part streams in order to be burnt. This considerably widens the bandwidth of the fuel mass flow which can be set within the permissible range for the fuel side burner pressure loss, with the result that lower fuel mass flows are possible in particular compared to conventional burner operation. Dividing the synthesis gas into a first part stream and a second, separate part stream or optionally into further part streams allows fuel to be fed to the burner at correspondingly spatially different locations in order to be burnt. Accordingly, two or more combustion zones are formed, which are assigned to a corresponding part stream of synthesis gas.

This advantageously avoids combustion instability resulting from fuel side burner pressure losses being too low in synthesis gas mode. Furthermore, possibly complex design modifications to the burner to adapt to synthesis gas operation, in particular with a view to avoiding burner or combustion chamber humming, in the future can be avoided. Compared with operation with just one synthesis gas passage, feeding synthesis gas to the burner in at least two part streams makes it possible in general terms to achieve improved options by adjusting and optimizing the operating mode of the burner. In this context, it has proven particularly advantageous that the combustion of the synthesis gas in the burner can be deliberately adjusted and optimized by adjusting the part streams in a very efficient way to the desired operating mode of the burner, e.g. base load or part load or idling. The widened range of possible operating settings makes it easier to match the system to altered fuel boundary conditions.

This new operating mode allows stepped synthesis gas operation. This firstly allows a sufficiently low pressure loss across the burner in full load operation with correspondingly significant mass flows in all the part streams, in particular the first and second part streams, and secondly also allows a gas turbine assigned to the burner to be operated at minimal load or in idling mode with only one significant part stream of synthesis gas. In this case, the first part stream or if appropriate further part streams and the second part stream can advantageously be subject to different flow conductances as they flow separately through the burner and into a respective combustion zone, with the result that, given a predetermined range of variation in the fuel mass flow, a significantly reduced range of variation in the pressure loss in the burner is achieved compared to when only one synthesis gas stream is used. As a result, the pressure loss in the burner at base load of the gas turbine compared to the pressure loss at minimum load, e.g. in idling mode, is advantageously lower than with a single stream concept using the same design of burner.

In one preferred configuration, the first part stream and the second part stream are in each case fed to the burner in a controlled manner. This configuration makes it possible to control the part streams independently of one another, so that the operating bandwidth of the burner is widened. In this case it is possible, for example, to select an operating mode in which the overall mass flow of synthesis gas is kept constant, with the first part stream and the second part stream being matched to one another with regard to the combustion power which can be achieved and to stable operation.

It is preferable for natural gas or steam to be admixed to at least one of the part streams in order to alter the calorific value. Depending on the particular requirements, the calorific value of a part stream can be increased or reduced by admixing natural gas or steam. It is advantageously possible for both part streams to be inerted independently of one another by the application of steam or another inerting medium, such as for example nitrogen. Therefore, the calorific value can be set for both part streams of synthesis gas, and in particular the calorific value of the part streams can be set differently, with the result that a correspondingly different conversion of heat by combustion can be achieved in the corresponding combustion zone. This advantageously provides a further degree of freedom, namely the calorific value, it being possible for this calorific value to be set individually for each of the part steams of synthesis gas according to the particular requirements.

It is preferable for the part streams to be set as a function of the power which is to be produced by the gas turbine. In the method for operating a burner of a gas turbine with the synthesis gas, it has proven particularly advantageous for the part streams, i.e. in particular their particular level of the gas mass flow or their particular specific calorific value, to be controlled as a function of the power to be produced by the gas turbine. In this case, by way of example, the power of the gas turbine can be predetermined at a set value which is common to all the fuel passages, and the gas flows for each passage can be adjusted independently according to the set value in a downstream control circuit as a function of the requirements described above, e.g. in a closed loop control circuit.

In the event of minimum load or idling operation of the gas turbine, it is preferable for one of the part streams to be zero. This operating mode can therefore be realized by delivering a part stream of synthesis gas to the burner. For this purpose, it is advantageous for that one of the part streams which, in view of a required minimum pressure loss therefor, can achieve a corresponding flow resistance as it flows through the burner to the combustion zone, to be selected for the minimum load or idling mode of the gas turbine. In the event of a significant flow resistance, combustion instability, for example on account of the pressure drop being too low across the burner, can be avoided even with a low mass flow of the selected part stream of synthesis gas.

According to an embodiment of the invention, an object relating to a power plant installation may be achieved by a power plant installation. In particular, this may be done by an installation for carrying out the method described above, having a gas turbine, which is assigned a combustion chamber having at least one burner, and having a fuel system, which is connected upstream of the combustion chamber and includes a gasification device for fossil fuel and a gas line which branches off from the gasification device and opens out into the combustion chamber, in which installation a further gas line branches off from the gas line upstream of the combustion chamber. The gas line may be connected to a first fuel passage of the burner and the further gas line may be connected to a second fuel passage, which is separated in terms of flow from the first fuel passage, of the burner.

In this case, it is advantageously possible for a second fuel passage, which is already present at the burner and is usually designed as a passage for natural gas with a high calorific value of typically 40,000 kJ/kg to additionally be used a second synthesis gas passage, which in flow terms is arranged from the first fuel passage. Therefore, the burner of the power plant installation has two fuel passages for synthesis gas which is provided in the gasification device by gasification of the fossil fuel and can be fed separately, via the gas line and the further gas line, to the fuel passage respectively connected thereto. The flow conductance for synthesis gas may be different for the first fuel passage and the second fuel passage, with the result that a stepped, in particular two stage, supply of fuel is achieved by targeted application of a respective part steam of synthesis gas to the fuel passages. As a result, the power plant installation is designed especially for the combustion of fuel gas with a low calorific value, e.g. originating from the gasification of coal as a fossil fuel. The stepped supply of synthesis gas advantageously widens the bandwidth of the fuel mass flow which can be set within the permissible range of the fuel side burner pressure loss in synthesis gas mode, and in this way the burner pressure loss in full load operation can be minimized or at least substantially reduced.

In a preferred configuration, a control fitting, by which the flow of fuel in the associated fuel passages can in each case be controlled, is provided in both the gas line and the further gas line. The gas lines having the control fittings for synthesis gas are in this case connected in parallel, so that each fitting controls the corresponding part stream passing to its associated fuel passage.

It is preferable for a gas lock, which is arranged upstream of the location where the further gas line branches off from the gas line, to be connected into the gas line.

This on the one hand ensures the gas lock function and on the other hand reduces the number of shut off and control fittings. A quick closing or tightly sealing fitting is advantageously provided in the gas line upstream of the location where the further gas line branches off from the gas line.

The power plant installation with gasification device can be operated both with the synthesis gas, which is generated, for example, from coal or residual oil, and with a second fuel, such as for example natural gas. In the event of a changeover from synthesis gas to second fuel or vice versa, it is for safety reasons necessary for the area between the gas lock and the combustion chamber, i.e. the gas turbine fuel system, to be purged with an inert medium, such as nitrogen or steam.

In the power plant installation, this requirement can be met, for example, by the gas lock which is connected into the gas line and is arranged upstream of the combustion chamber including a quick closing fitting, a pressure relief or excess pressure system and a gas lock fitting. As a result, in the event of a change in the gas which is to be fed to the burner of the gas turbine, it is possible to ensure that the synthesis gas or the second fuel as well as any flue gas is displaced out of the fuel system in a particularly reliable way, since the volume to be purged is relatively small. Moreover, if the volume to be purged is small, a purge in just one direction via both fuel passages has proven sufficient, with the result that complex control mechanisms for the purge operation can be eliminated. In the event of a changeover to a second fuel, e.g. natural gas, there is no need to purge the further gas line and the associated fuel passage. It is only necessary for both fuel passages, or if appropriate a plurality of fuel passages, to be purged in the event of a quick closure of the gas turbine.

The purge advantageously takes place only in the forward direction, i.e. in the direction of the combustion chamber or of the burner of the gas turbine. The purge operation may be carried out alternatively using steam or nitrogen, e.g. pure nitrogen. On account of the small volume which has to be purged, a purge using nitrogen is particularly economical. Furthermore, in this case there is no need for any steam to be extracted from a steam turbine installation arranged in the power plant installation for the purge operation, making the overall efficiency of the power plant installation particularly high. In addition, there is no need to use high alloy steels, since at most a small amount of corrosion can occur.

A small volume to be purged can be achieved in the power plant installation by way of compact arrangement of the components. For example, if the gas lock and the quick closing fitting are arranged next to one another, the quick closing fitting can perform the function of one of the fittings provided in the gas lock, so that this fitting can be dispensed with and the volume of the gas turbine fuel system which has to be purged can be made particularly small. Furthermore, the relatively small volume of the fuel system makes load shedding in the event of an excessive speed considerably simpler, in particular on account of the reduced lag effect in the gas carrying components.

Ball valves or ball cocks are customarily used as fittings for the gas lock which is arranged in particular upstream of the location where the further gas line branches off from the gas line and is connected into the gas line. These ball valves have particularly good gas sealing properties. The quick closing fitting may, for example, be designed as a quick closing flap. However, depending on the overall size of the fitting, it is also possible for any other quick closing fitting, such as for example a suitable quick closing valve, to be used for this purpose. Therefore, the power plant installation having the gasification device can be operated particularly reliably in synthesis gas mode or in the event of a change of fuel to a second fuel.

In one preferred configuration of the power plant installation, natural gas or steam can be delivered to the further gas line via a feed device. The further gas line, which is connected to the second fuel passage of the burner, can be adjusted with regard to the calorific value for operation of the second fuel passage as a result of natural gas or steam being admixed to the synthesis gas. Admixing natural gas to the synthesis gas increases the calorific value. On the other hand, the calorific value can be reduced by admixing steam to the synthesis gas. Targeted admixing of natural gas or steam via the feed device allows the calorific value to be very accurately matched to the desired operating mode of the burner.

Synthesis gas, which has been formed in particular by gasification of a fossil fuel in the gasification device, can preferably fed to the further gas line. Therefore, synthesis gas, natural gas, steam or a mixture of various fuels can be fed to the further gas line in a targeted fashion as required.

The power plant installation is preferably configured as a gas and steam turbine installation, having a heat recovery steam generator which is connected downstream of the gas turbine on the flue gas side and the heating surfaces of which are connected into the water-steam circuit of a steam turbine.

Further advantages of the power plant installation will emerge by analogy to the advantages of the method described above for operating a burner of a gas turbine.

BRIEF DESCRIPTION OF THE DRAWINGS

An exemplary embodiment of the invention is explained in more detail with reference to a drawing, in which, in some cases diagrammatically and not to scale.

DETAILED DESCRIPTION OF THE PREFERRED EMBODIMENTS

Figure 1B:
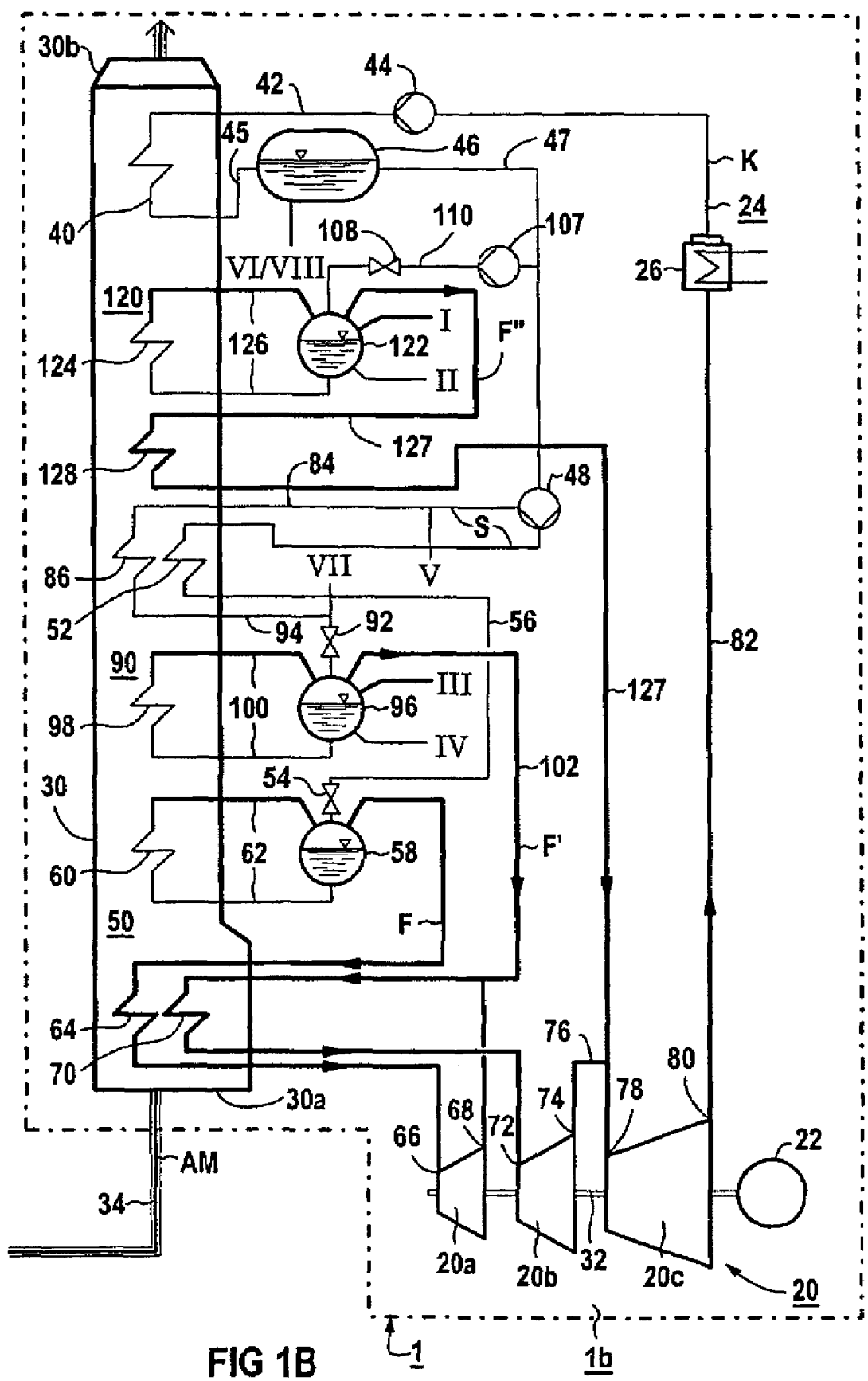
FIG. 1 shows a power plant installation in which a fuel system having a gasification device is connected upstream of the gas turbine.

The power plant installation 3 shown in FIG. 1 is designed as a gas and steam turbine installation 1 and includes a gas turbine installation 1a and a steam turbine installation 1b. The gas turbine installation 1a includes a gas turbine 2 with an air compressor 4 coupled to it and a combustion chamber 6, which is connected upstream of the gas turbine 2 and is connected to a compressed air line 8 of the compressor 4. The combustion chamber 6 includes a burner 7. The gas turbine 2 and the air compressor 4 as well as a generator 10 are arranged on a common shaft 12.

The steam turbine installation 1b includes a steam turbine 20 with a generator 22 coupled to it and also, in a water steam circuit 24, a condenser 26 connected downstream of the steam turbine 20 and a heat recovery steam generator 30. The steam turbine 20 comprises a first pressure stage or a high-pressure part 20a and a second pressure stage or a medium pressure part 20b. There is also a third pressure stage or a low pressure part 20c of the steam turbine 20, the pressure stages 20a, 20b, 20c driving the generator 22 via a common shaft 32.

An exhaust gas line 34 is connected to an inlet 30a of the heat recovery steam generator 30 for the purpose of feeding working medium AM, which has been expanded in the gas turbine 2, or flue gas into the heat recovery steam generator 30. The expanded working medium AM from the gas turbine 2 leaves the heat recovery steam generator 30 via its outlet 30b in the direction of a stack (not shown in more detail).

The heat recovery steam generator 30 includes a condensate preheater 40, which on the inlet side is connected via a condensate line 42 into the one condensate pump unit 44 and can be fed with condensate K from the condenser 26. On the outlet side, the condensate preheater 40 is connected, via a line 45, to a feedwater tank 46. Moreover, to allow the condensate preheater 40 to be bypassed if necessary, the condensate line 42 can be connected directly to the feedwater tank 46 via a bypass line (not shown). The feedwater tank 46 is connected via a line 47 to a high pressure feed pump 48 with medium pressure removal.

The high pressure feed pump 48 brings the feedwater S flowing out of the feedwater tank 46 to a pressure level which is suitable for a high pressure stage 50, assigned to the high pressure part 20a of the steam turbine 20, in the water steam circuit 24. The high pressure feedwater S can be fed to the high pressure stage 50 via a feedwater preheater 52, which on the output side is connected to a high pressure drum 58 via a feedwater line 56 which can be shut off by way of a valve 54. The high pressure drum 58 is connected to a high pressure evaporator 60 arranged in the heat recovery steam generator 30 in order to form a water steam cycle 62. To discharge live steam F, the high pressure drum 58 is connected to a high pressure superheater 64 which is arranged in the heat recovery steam generator 30 and on the outlet side is connected to the steam inlet 66 of the high pressure part 20a of the steam turbine 20.

The steam outlet 68 of the high pressure part 20a of the steam turbine 20 is connected via a reheater 70 to the steam inlet 72 of the medium pressure part 20b of the steam turbine 20. The steam outlet 74 of the latter is connected via an overflow line 76 to the steam inlet 78 of the low pressure part 20c of the steam turbine 20. The steam outlet 80 of the low pressure part 20c of the steam turbine 20 is connected via a steam line 82 to the condenser 26, so that a closed water steam circuit 24 is formed.

Moreover, a branch line 84 branches off from the high pressure feed pump 48 at a removal location, at which the condensate K has reached a medium pressure. This branch line 84 is connected, via a further feedwater preheater 86 or medium pressure economizer, to a medium pressure stage 90, assigned to the medium pressure part 20b of the steam turbine 20, of the water steam circuit. For this purpose, the second feedwater preheater 86 is connected on the outlet side, via a feedwater line 94 which can be shut off by a valve 92, to a medium pressure drum 96 of the medium pressure stage 90.

The medium pressure drum 96 is connected to a heating surface 98, which is arranged in the heat recovery steam generator 30 and is designed as a medium pressure evaporator, in order to form a water steam cycle 100. To discharge medium pressure live steam F', the medium pressure drum 96 is connected via a steam line 102 to the reheater 70 and thereby to the steam inlet 72 of the medium pressure part 20b of the steam turbine 20.

A further line 110, which is provided with a low pressure feed pump 107, can be shut off by a valve 108 and is connected to a low pressure stage 120, assigned to the low pressure part 20c of the steam turbine 20, of the water steam circuit 24, branches off from the line 47. The low pressure stage 120 includes a low pressure drum 122, which is connected to a heating surface 124, which is arranged in the heat recovery steam generator 30 and is designed as a low pressure evaporator, in order to form a water steam cycle 126. To discharge low pressure live steam F", the low pressure drum 122 is connected to the overflow line 76 via a steam line 127, into which a low pressure superheater 128 is connected. Therefore, in the exemplary embodiment the water steam circuit 24 of the gas and steam turbine installation 1 comprises three pressure stages 50, 90, 120. Alternatively, however, it is also possible to provide fewer, in particular two pressure stages.

The gas turbine installation 1a is designed to operate with a gasified untreated gas or synthesis gas SG which is generated by the gasification of a fossil fuel B. The synthesis gas SG provided may, for example, be gasified coal or gasified oil. For this purpose, the gas turbine installation 1a includes a fuel system 129, by which synthesis gas SG can be fed to the burner 7 in the combustion chamber 6 assigned to the gas turbine 2. The fuel system 129 includes a gas line 130, which connects a gasification device 132 to the combustion chamber 6 of the gas turbine. Coal, natural gas or oil can be fed as fossil fuel B to the gasification device 132 via an introduction system 134. Furthermore, the gasification system 129 includes components which are connected into the gas line 130 between the gasification device 132 and the combustion chamber 6 of the gas turbine 2.

Upstream of the combustion chamber 6, a further gas line 131 branches off from the gas line 130, the gas line 130 and the further gas line 131 being separately connected to the burner 7 of the combustion chamber 6. The synthesis gas SG can be divided into a first part stream SG1 and a second part stream SG2 via the gas line 130 and the further gas line 131. The part streams SG1, SG2 of synthesis gas SG can in this case be fed separately to the burner 7 in order to be burnt. A first part stream SG1 can be supplied via the gas line 130, and a second part stream SG2 can be supplied via the further gas line 131. The further gas line 131 in this case branches off from the gas line 130 in a region 236 which is described in more detail in FIG. 2. Downstream of the region 236, the gas line 130 and the further gas line 131 are connected substantially in parallel in terms of flow and are connected to the burner 7 at various connection locations, so that the part streams SG1, SG2 can be fed to the burner 7 separately in terms of flow and independently of one another.

An air separation installation 138 assigned to the fuel system 129 is connected upstream of the gasification device 132 via an oxygen line 136 in order to provide the oxygen O2 required for the gasification of the fossil fuel B. The inlet side of the air separation installation 138 can be fed with an air stream L which is composed of a first air part stream L1 and a second air part stream L2. The first air part-stream L1 can be removed from the air which has been compressed in the air compressor 4. For this purpose, the air separation installation 138 is connected on the inlet side to a removal air line 140, which branches off from the compressed air line 8 at a branching location 142. Moreover, a further air line 143, into which an additional air compressor 144 is connected and via which the second air part stream L2 can be fed to the air separation installation 138, opens out into the removal air line 140.

In the exemplary embodiment, therefore, the total air stream L flowing to the air separation installation 138 is composed of the air part stream L2 which has been branched off from the compressed air line A and the air part stream L2 which has been delivered by the additional air compressor 144. A circuit concept of this nature is also referred to as a partially integrated installation concept. In an alternative configuration, known as the fully integrated installation concept, the further air line 143 together with the additional air compressor 144 can be dispensed with, so that the entire feed of air to the air separation installation 138 is effected by way of the air part stream L1 removed from the compressed air line 8.

The nitrogen N2 which is obtained in addition to the oxygen O2 in the air separation installation 138 during the separation of the air stream L is fed via a nitrogen feed line 230, which is connected to the air separation installation 138, to a mixing device 146, where it is admixed to the synthesis gas SG. The mixing device 146 is designed to mix the nitrogen N2 with the synthesis gas particularly uniformly without laminar flows. The mixing device 146 is optional and can also be dispensed with if desired in other installation concepts with low oxygen contents in the nitrogen.

The synthesis gas SG flowing out of the gasification device 132 initially passes via the gas line 130 into a synthesis gas heat recovery steam generator 147, in which the synthesis gas SG is cooled by heat exchange with a flow medium. High pressure steam which is generated during this heat exchange is fed to the high pressure stage 50 of the water steam circuit 24, in a manner which is not illustrated in more detail.

The gas line 130, a dedusting device 148 for the synthesis gas SG and a desulfurization installation 149 are connected downstream of the synthesis gas heat recovery stream generator 147 and upstream of a mixing device 146, as seen in the direction of flow of the synthesis gas SG. In an alternative configuration, it is also possible for a carbon black scrubbing device to be provided instead of the dedusting device 148, in particular when the fuel being gasified is oil.

To achieve a particularly low level of pollutant emissions during the combustion of the gasified fuel B in the burner 7 arranged in the combustion chamber 6, there is provision for the gasified fuel B to be laden with steam before it enters the combustion chamber 6. This can take place, in a manner which is particularly advantageous in thermal terms, in a saturator system.

For this purpose, a saturator 150, in which the fuel B which has been gasified to form the synthesis gas SG is guided in countercurrent to heated saturator water W, is connected into the gas line 130. The saturator water W circulates in a saturator circuit 152 which is connected to the saturator 150 and into which a circulation pump 154 and a heat exchanger 156 for preheating the saturator water W are connected. The primary side of the heat exchanger 156 is acted on by preheated feedwater at the medium pressure stage 90 of the water steam circuit 24. An infeed line 158 is connected to the saturator circuit 152 in order to compensate for the losses of saturator water W which occur during the saturation of the gasified fuel.

On the secondary side, a heat exchanger 159, which acts as a synthesis gas/mixed gas heat exchanger, is connected into the gas line 130 downstream of the saturator 150, as seen in the direction of flow of the synthesis gas SG. On the primary side, the heat exchanger 159 is likewise connected into the gas line 130, at a location upstream of the dedusting installation 148, so that the synthesis gas SG which flows to the dedusting installation 148 transfers some of its heat to the synthesis gas SG flowing out of the saturator 150.

It is also possible for the synthesis gas SG to be passed through the heat exchanger 159 before it enters the desulfurization installation 149 in the case of a circuit concept which is modified with regard to the other components. In particular when a carbon black scrubbing device is connected into the circuit, the heat exchanger 159 may preferably be incorporated downstream of the carbon black scrubbing device on the synthesis gas side.

A further heat exchanger 160, which on the primary side may be heated with feedwater or with steam, is connected on the secondary side into the gas line 130, between the saturator 150 and the heat exchanger 159. The heat exchanger 159, which is formed as a synthesis gas/pure gas heat exchanger, and the heat exchanger 160 result in particularly reliable preheating of the synthesis gas SG flowing to the burner 7 of the combustion chamber 6 of the gas turbine 2 even in the event of different operating states of the gas and steam turbine installation 1. A heat exchanger 162, which on the secondary side is designed as a medium pressure evaporator for a flow medium S', is on the primary side connected into the removal air line 140 in order to cool the part stream L1 of compressed air which is to be fed to the air separation installation 138 and is also referred to as removal air.

To form an evaporator cycle 163, the heat exchanger 162 is connected to a water steam drum 146 designed as a medium pressure drum. The water steam drum 164 is connected via lines 166, 168 to the medium pressure drum 96 assigned to the water steam cycle 100. Alternatively, the heat exchanger 162 may also be directly connected to the medium pressure drum 96 on the secondary side. In the exemplary embodiment, therefore, the water stream drum 164 is indirectly connected to the heating surface 98 designed as medium pressure evaporator. Moreover, a feedwater line 170 is connected to the water steam drum 164 in order to top up evaporated flow medium S'.

A further heat exchanger 172, which on the secondary side is designed as a low pressure evaporator for a flow medium S", is connected into the removal air line 140, downstream of the heat exchanger 162 as seen in the direction of flow of the part stream L1 of compressed air. To form an evaporator cycle 174, the heat exchanger 172 is connected to a water steam drum 176 designed as a low pressure drum. In the exemplary embodiment, the water steam drum 176 is connected via lines 178, 180 to the low pressure drum 122 assigned to the water steam cycle 126 and is therefore indirectly connected to the heating surface 124 designed low pressure evaporator.

Alternatively, however, the water steam drum 176 may also be connected up in another suitable way, in which case steam removed from the water steam drum 176 can be fed to an auxiliary consumer as process steam and/or as heating steam. In a further alternative configuration, the heat exchanger 172 may also be connected directly to the low pressure drum 122 on the secondary side. Moreover, the water steam drum 176 is connected to a feedwater line 182.

The evaporator cycles 163, 174 may each be designed as a forced cycle, in which case circulation of the flow medium S' or S" is ensured by a circulation pump and the flow medium S', S" at least partially evaporates in the heat exchanger 162 or 172, respectively, designed as an evaporator. In the exemplary embodiment, however, both the evaporator cycle 163 and the evaporator cycle 174 are in each case designed as a natural cycle, in which case the circulation of the flow medium S' or S" is ensured by the pressure differences which are established during the evaporation process and/or by the geodetic arrangement of the respective heat exchanger 162 or 172 and of the respective water steam drum 164 or 176. In this configuration, in each case only a relatively small recirculation pump (not shown in more detail) for starting up the system is connected into the evaporator cycle 163 or into the evaporator cycle 174.

To introduce heat into the saturator circuit 152, there is, in addition to the heat exchanger 156, which can be fed with heated feedwater S which has been branched off downstream of the feedwater preheater 86, a saturator water heat exchanger 184, which on the primary side can be fed with feedwater S from the feedwater tank 46. For this purpose, the saturator water heat exchanger 184 is on the primary side connected on the inlet side to the branch line 84 via a line 186 and on the outlet side to the feedwater tank 46 via a line 88. To reheat the cooled feedwater S flowing out of the feedwater heat exchanger 184, an additional heat exchanger 190, which on the primary side is connected downstream of the heat exchanger 172 in the removal air line 140, is connected into the line 188. An arrangement of this nature makes it possible to achieve a particularly high degree of heat recovery from the removal air and therefore a particularly high efficiency of the gas and steam turbine installation 1. A cooling air line 192, via which a partial quantity L' of the cooled part stream L can be fed to the gas turbine 2 as cooling air for cooling the blades and vanes, branches off from the removal air line 140 between the heat exchanger 172 and the heat exchanger 190, as seen in the direction of flow of the air part stream L1. This embodiment is used occasionally.

When the gas and steam turbine installation 1 is operating, synthesis gas SG, which has been obtained by gasification of the fossil fuel B in the gasification device 132, is fed to the burner 7 of the gas turbine 2. In the process, the synthesis gas SG is divided in the region 236 into a first part stream SG1 and a second part stream SG2, and the part streams SG1, SG2 are fed separately to the burner 7 in order to be burnt. The first part stream SG and the second part stream SG2 may each be fed to the burner 7 in a controlled manner.

Figure 2:
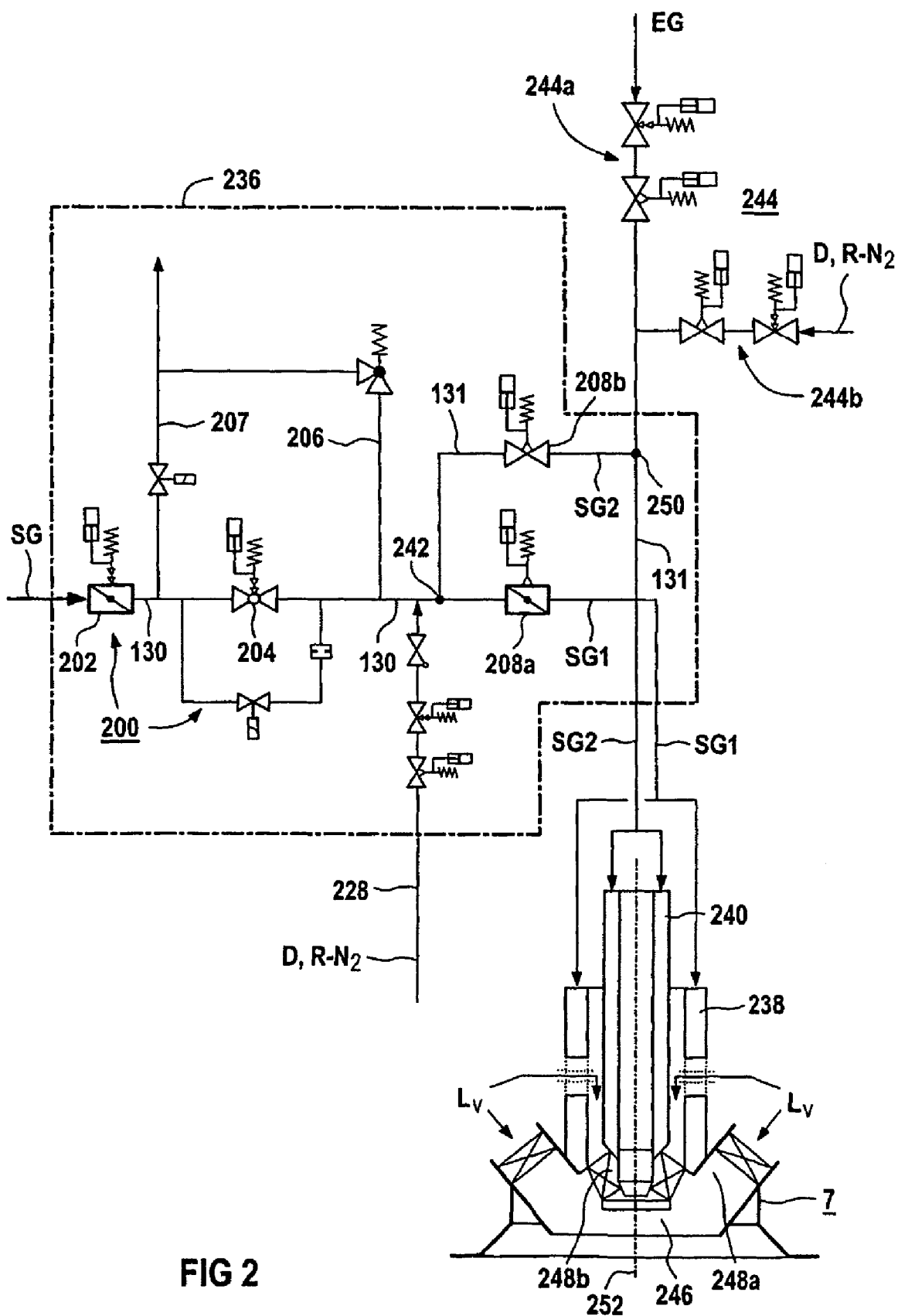
FIG. 2 shows a detailed view of the region 236 shown in FIG. 1 with an associated burner of the gas turbine.

The circuit concept on which the synthesis gas mode of the burner 7 of the gas turbine 2 is based is illustrated in detail in FIG. 2. FIG. 2 substantially shows an enlarged representation of the region 236 shown in FIG. 1 and the corresponding connection to the burner 7, which is illustrated on an enlarged scale.

The burner 7 is arranged in a combustion chamber 6, the combustion chamber 6 being assigned to the gas turbine 2 (cf. FIG. 1). In the region 36, the further gas line 131 branches off from the gas line 130 at a branching location 242. The burner 7 has a burner axis 252, along which a first fuel passage 238 and a second fuel passage 240, which is separate from the first fuel passage 238 in terms of flow, extend. Furthermore, the burner has a combustion space 246, in which a first combustion zone 248a and a second combustion zone 248b are formed. The first combustion zone 248a is assigned to the first fuel passage 238, and the second combustion zone 248b is assigned to the second fuel passage 240. In this case, the combustion zones 248a, 248b may at least partially physically overlap one another. The fuel passages 238, 240 are arranged at a radial distance from one another around the burner axis 252 of the burner 7, the fuel passages 238, 240 in each case forming a cylindrical annular space.

When the burner 7 is operating, it is fed with combustion air LV which is removed from the compressor 4 via the compressed air line 8 (cf. FIG. 1). Furthermore, the gas line 130 is connected to the first fuel passage 238, and the further gas line 131 is connected to the second fuel passage 240, so that a first part stream SG1 of synthesis gas SG is fed to the first fuel passage 238 and a second part stream SG2 of synthesis gas SG is fed to the second fuel passage 240, in order to be burnt. In this case, the first part stream SG1 is laden with combustion air L and burnt in the first combustion zone 248a and the second part stream SG2 is laden with combustion air L and burnt in the second combustion zone 248b, so as to form hot combustion gases which act on the gas turbine 2.

When the fuel system 129 shown in FIG. 1A is being shut down, a purge operation is required. This takes place in such a manner that a first and a second region of the fuel gasification system 129 are purged separately with nitrogen N2 in one or more steps. The gasification system or the first region and the gas turbine fuel system or the second region are in this case separated from one another in the region 236 by a gas lock 200 shown in FIG. 2. The gas lock 200 is in this case connected into the gas line 130, with the gas lock 200 being arranged upstream of the location 242 where the further gas line 131 branches off from the gas line 130. The gasification system itself comprises the gasification device 132 as far as the gas lock 200, and the gas turbine fuel system comprises the gas lock 200 and the downstream components as far as the combustion chamber 6, including the burner 7, of the gas turbine 2.

The gas lock 200 comprises a quick closing fitting 202 which is arranged in the gas line 130 and connected directly downstream of which there is a gas lock fitting 204 designed as a ball valve. Residual gas is discharged to an excess gas burner via the exhaust gas line 207 during the purge after the gasification device 132 has been switched off or during the purge of the saturator 150 and downstream heat exchanger. The exhaust gas line 207 with associated fitting serves as a pressure relief system 206 for the gas lock 200. The gas line 130 can be shut off in a gastight manner by means of the gas lock 200 and if necessary can be closed off within a particularly short time by way of the quick closing fitting 202.

A control fitting 208a, which is connected into the gas line 130 and is used to control the first part stream SG1 of synthesis gas SG to the burner 7, is connected directly downstream of the gas lock 200. A further control fitting 208b is connected into the further gas line 131, which branches off from the gas line 130. The second part stream SG of synthesis gas SG to the burner 7 can be controlled by way of the control fitting 208b.

Pure nitrogen R N2 from the air separation installation 138 is provided for the purpose of purging the gasification system or the first region of the fuel system with nitrogen N2, i.e. from the gasification device 132 to the gas lock 200. For this purpose, the nitrogen N2, which is produced in addition to the oxygen O2 in the air separation installation 132 during the separation of the air stream L, is discharged from the air separation installation 138 as pure nitrogen R N2 via a feed line 210. A branch line 214, which can be shut off by a valve 212 and opens out in order to purge the first region of the fuel system 129 and the gasification device 132 for fossil fuel, branches off from the first feed line 210.

Pure nitrogen R N2 is also provided for the purpose of purging the second region or the gas turbine fuel system with nitrogen N2 as a purge medium. For this purpose, the feed line 210 opens out into a nitrogen store 220. In addition, a reserve line 224, which can be shut off by the valve 222 and on the inlet side is connected to an emergency filling system 226 for pure nitrogen R N2, opens out into the feed line 210. On account of the fact that the nitrogen store 220 is connected both to the air separation installation 138 and to the emergency filling system 226, it can be fed both with pure nitrogen R N2 from the air separation installation and with pure nitrogen R N2 from the emergency filling system 226.

As a result, purging of the gasification system 129 is ensured particularly reliably even in the event of the air separation installation 138 failing. The dimensions of the nitrogen store 226 are such that it covers the demand for pure nitrogen R N2 for the purging operation including a sufficiently high reserve capacity. On the outlet side, the nitrogen store 226 is connected to the gas line 130 via a purge line 228. The purge line 228 opens out into the gas line 130 downstream of the synthesis gas SG in the region immediately following the gas lock 200, i.e. following the gas lock fitting 204.

A second feed line 230, which opens out into the mixing device 146, branches off from the air separation installation 138 (FIG. 1) for the purpose of supplying impure nitrogen U N2 which has been generated in the air separation installation 138. In the mixing device 146, the impure nitrogen U N2 is admixed to the synthesis gas SG in order to reduce the levels of NOx emissions from the gas turbine. The mixing device 146 is designed for a particularly uniform mixing, without any laminar flows, of the nitrogen N2 with the synthesis gas SG.

In the event of any changeover in the gas turbine 2 from synthesis gas SG to a second fuel, corresponding to a change in the fuel gas fed to the burner 7 of the combustion chamber 6, there is provision for the gas turbine fuel system 129 to be purged with nitrogen. The synthesis gas SG located in the gas turbine fuel system 129 has to be virtually completely displaced by the purge operation, for safety reasons.

In synthesis gas mode, i.e. during combustion of synthesis gas SG, which is fed to the associated fuel passages 240, 238 shown in FIG. 2 in part streams SG1 and SG2, in order to be burnt, natural gas EG or steam D can be admixed to the second part stream SG2. This allows the calorific value of the first part stream SG1, used to operate the second fuel passage 240, to be increased or reduced as required. For this purpose, there is a feed device 244, which comprises a natural gas feed system 244a and a further feed system 244b for steam D or pure nitrogen R N2.

The feed device 244 is connected to the further gas line 131 at a connection location 250 in the region 236, so that if necessary it is possible to feed a corresponding fluid into the further gas line 131 and to the second fuel passage 240 via the feed device 244. In this case, the second fuel passage 240 is advantageously supplied with synthesis gas SG independently of the first fuel passage 238. Furthermore, the part streams SG1, SG2 can be fed independently of one another with pure nitrogen R N2 or steam D via the purge line 228 or the further feed system 244b of the feed device 244 and can thereby be purged. Therefore, both synthesis part streams SG1, SG2 can be operated with a different, controllable calorific value. The feed system 244 which is assigned to the second fuel passage 240 in this case performs two tasks, namely that of reducing NOx in a natural gas mode and of targeted adjustment of the calorific value and operational control of combustion in the synthesis gas mode.

This novel method for operating a burner 7, together with the installation concept described, allows stepped operation of a power plant installation 3 with synthesis gas SG. This synthesis mode is distinguished on the one hand by a sufficiently low pressure loss in full load operation with respective part streams SG1, SG2 flowing through the two fuel passages 238, 240. On the other hand, however, the required minimum pressure loss in the event of minimum load or idling mode of the gas turbine 2 with synthesis gas SG is also ensured, as a result of, for example, only the second fuel passage 240 being utilized when required.

For this purpose, the second fuel passage 240 may have a greater flow resistance than the first fuel passage 238 by employing a suitable structural design and dimensioning of the second fuel passage 240. The simultaneous utilization of both fuel passages 238, 240, which may have different flow resistances, allows a significantly narrower range of variation in the pressure loss compared to the systems which have previously been known to be achieved for a predetermined range of variation in the total fuel mass flow fed to the burner 7. Consequently, the pressure loss at base load compared to the pressure loss under minimum load, e.g. when the gas turbine 2 is idling, is lower than with a single passage concept, in which just one synthesis gas stream is fed to a burner 7 in order to be burnt.

By adapting the dilution ratio of the synthesis gas SG, which is delivered to the second fuel passage 240, via the feed device 244, it is possible to stabilize the first fuel passage 238, which can serve as the main passage for the synthesis gas SG. In the event of a low dilution of the second part stream SG2 of synthesis gas SG through the second fuel passage 240, the second fuel passage 240 can serve as a pilot flame for the first fuel passage 238, which may be more strongly diluted. Furthermore, by influencing the dilution ratio in a targeted manner, it is possible to influence flame oscillations in a very efficient way, without the need for complex changes to the geometry of the burner 7, purely by trimming the part streams SG1, SG2.

The two flow concept of the burner 7 operated using the method according to an embodiment of the invention particularly advantageously makes it possible to adapt the combustion behavior. As a result, the possible options for optimizing the combustion behavior in terms of combustion oscillations and burner temperatures are improved considerably by adapting the corresponding operating setting. An embodiment of the invention is distinguished in particular by the fact that at least one fuel passage of the burner 7, for example the second fuel passage 240, can be utilized with a dual function, specifically as a synthesis passage in synthesis gas mode or as a fuel passage for a further gaseous fuel (B), e.g. natural gas (EG) in natural gas mode. In this case, it is also possible for a mixture of synthesis gas and natural gas to be fed to a fuel passage, if appropriate with added steam, and to produce a novel type of mixing operation.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operating a burner of a gas turbine, comprising:
   gassifying a fossil fuel; and
   feeding gasified fossil fuel as synthesis gas to the burner assigned to the gas turbine in order to be burnt, wherein
      the synthesis gas is provided in a first part stream and a second part stream that branches from the first part stream,
      the first part stream is controlled by a first control fitting, the first control fitting being a butterfly valve, located downstream of a location where the second part stream branches from the first part stream and the second part stream is controlled by a second control fitting, the second control fitting being a globe valve, in the second part stream,
      the first part stream is carried by a first fuel passage in the burner and the second part stream is carried by a second fuel passage in the burner, the second fuel passage having a greater flow resistance than the first fuel passage and is arranged for also carrying a natural fuel to the burner, and
      the control streams are fed separately to the burner to be burnt.

2. The method as claimed in claim 1, wherein at least one of natural gas and steam is admixed to at least one of the part streams in order to change the calorific value of one of the part streams from the other of the part streams.

3. The method as claimed in claim 2, wherein the part streams are set as a function of the power which is to be produced by the gas turbine.

4. The method as claimed in claim 2, wherein, during at least one of minimum load and idling operation of the gas turbine, one of the part streams is zero.

5. The method as claimed in claim 1, wherein the part streams are set as a function of the power which is to be produced by the gas turbine.

6. The method as claimed in claim 5, wherein, during at least one of minimum load and idling operation of the gas turbine, one of the part streams is zero.

7. The method as claimed in claim 1, wherein, during at least one of minimum load and idling operation of the gas turbine, one of the part streams is zero.

8. The method of claim 1, further comprising the step of separately burning the first part stream and the second part stream.

9. The method as claimed in claim 1, wherein the natural fuel is different from the synthesis gas.

10. A power plant installation, comprising:
    a gas turbine, assigned a combustion chamber, including at least one burner, and including a fuel system connected upstream of the combustion chamber;
    a gasification device for fossil fuel;
    a gas line, branching off from the gasification device and opening out into the combustion chamber;
    a further gas line, branching off from the gas line upstream of the combustion chamber, the gas line being connected to a first fuel passage of the burner and the further gas line being connected to a second fuel passage, separated in terms of flow from the first fuel passage of the burner; and
    a feed device which includes at least a natural gas feed system, the feed device connecting to the second fuel passage,
    wherein a control fitting is provided in the gas line down stream of the location where the further gas line branches off from the gas line and another control fitting is provided in the further gas line, the second fuel passage having a greater flow resistance than the first fuel passage, and wherein the control fitting provided in the gas line is a butterfly valve and the another control fitting provided in the further gas line is a globe valve.

11. The power plant installation as claimed in claim 10, wherein a gas lock, arranged upstream of the location where the further gas line branches off from the gas line, is connected into the gas line.

12. The power plant installation as claimed in claim 11, wherein at least one of natural gas and steam is deliverable to the further gas line via a feed device.

13. The power plant installation as claimed in claim 11, wherein synthesis gas, generated in the gasification device, is feedable to the further gas line.

14. The power plant installation as claimed in claim 10, wherein at least one of natural gas and steam is deliverable to the further gas line via the feed device.

15. The power plant installation as claimed in claim 14, wherein synthesis gas, generated in the gasification device, is feedable to the further gas line.

16. The power plant installation as claimed in claim 10, wherein synthesis gas, generated in the gasification device, is feedable to the further gas line.

17. The power plant installation as claimed in claim 10, wherein a configuration as a gas and stream turbine installation includes a heat recovery steam generator connected downstream of the gas turbine on the flue gas side and the heating surfaces connected into the water steam circuit of a steam turbine.

18. The power plant installation as claimed in claim 10, wherein at least one of the natural gas and steam is admixed to at least one of the first fuel passage and the second fuel passage in order to change the calorific value of one of the fuel passages from the other of the fuel passages.

19. A method for operating a burner of a gas turbine, comprising:
    gassifying a fossil fuel;
    separately feeding a divided first part and a divided second part of the gasified fuel to the burner for burning; and
    independently controlling the divided first part and the divided second part of the gasified fuel to the burner for burning using a first control fitting, the first control fitting being a butterfly valve, located downstream of a location where the divided second part branches from the divided first part and the divided second part stream is controlled by a second control fitting, the second control fitting being a globe valve, in the divided second part and the first part stream is carried by a first fuel passage in the burner and the second part stream is carried by a second fuel passage in the burner, the second fuel passage having a greater flow resistance than the first fuel passage and arranged for also carrying a natural fuel to the burner.

20. The method of claim 19, further comprising the step of separately burning the first part and the second part.

21. The method as claimed in claim 19, wherein the first part and the second part are each fed to the burner in a controlled manner.

22. The method as claimed in claim 19, wherein at least one of natural gas and steam is admixed to at least one of the parts in order to change the calorific value of one of the part streams from the other of the part streams.

23. The method as claimed in claim 19, wherein the parts are set as a function of the power which is to be produced by the gas turbine.

24. The method of claim 19, wherein the natural fuel is different from the gasified fuel.

25. An apparatus for operating a burner of a gas turbine, comprising:
   means for gassifying a fossil fuel;
   means for separately feeding a divided first part and a divided second part of the gasified fuel to the burner for burning; and
   means for independently controlling the divided first part and the divided second part of the gasified fossil fuel wherein the means for controlling the divided first part includes a butterfly valve provided in a gas line down stream of a location where the divided second part branches off from the divided first part and the first part stream is carried by a first fuel passage in the burner and a globe valve provided in the second part stream, the second part stream being carried by a second fuel passage in the burner arranged for also carrying a natural fuel to the burner, wherein the second fuel passage has a greater flow resistance than the first fuel passage.

26. The apparatus of claim 25, wherein the natural fuel is different from the gasified fuel.

27. An apparatus, comprising:
   a gas turbine, assigned a combustion chamber including at least one burner, and including a fuel system connected upstream of the combustion chamber;
   means for gasifying fossil fuel;
   a gas line, connecting the gasification device and the combustion chamber;
   a further gas line, branching off from the gas line upstream of the combustion chamber, the gas line being connected to a first fuel passage of the burner and the further gas line being connected to a second fuel passage of the burner, separated in terms of flow from the first fuel passage;
   means for feeding a natural gas to the second fuel passage; and
   means for independently controlling the gasified fossil fuel in the gas line and the gasified fossil fuel in the further gas line, wherein the means for independently controlling the gasified fuel in the gas line includes a butterfly valve provided in the gas line down stream of the location where the further gas line branches off from the gas line and another control fitting, the another control fitting being a globe valve, provided in the further gas line and the first part stream is carried by a first fuel passage in the burner and the second part stream is carried by a second fuel passage in the burner, the second fuel passage having a greater flow resistance than the first fuel passage.

* * * * *